(12) United States Patent
Wang

(10) Patent No.: US 11,442,337 B2
(45) Date of Patent: Sep. 13, 2022

(54) FRAME ASSEMBLY FOR MOUNTING A FABRIC AND THE FABRIC FOR MOUNTING THEREON

(71) Applicant: PRINTALY PTY LTD, Castle Hill (AU)

(72) Inventor: Yuandi Wang, Castle Hill (AU)

(73) Assignee: PRINTALY PTY LTD, Castle Hill (AU)

( * ) Notice: Subject to any disclaimer, the term of this patent is extended or adjusted under 35 U.S.C. 154(b) by 255 days.

(21) Appl. No.: 16/911,319

(22) Filed: Jun. 24, 2020

(65) Prior Publication Data
US 2021/0048731 A1    Feb. 18, 2021

(30) Foreign Application Priority Data

Aug. 13, 2019  (AU) ................................. 2019100896

(51) Int. Cl.
*G03B 15/00* (2021.01)
(52) U.S. Cl.
CPC .................................... *G03B 15/00* (2013.01)
(58) Field of Classification Search
CPC ........ G03B 15/06; G03B 15/10; G03B 15/00; G03B 17/561; G03B 2217/241
See application file for complete search history.

(56) References Cited

U.S. PATENT DOCUMENTS

| 4,951,076 | A | * | 8/1990 | Baillie-Hamilton ... G03B 15/06 396/3 |
| 10,848,647 | B1 | * | 11/2020 | Bellomo .............. H04N 5/2621 |
| 2003/0070770 | A1 | * | 4/2003 | Nussdorf ........... G09F 15/0068 160/135 |
| 2011/0299841 | A1 | * | 12/2011 | Cheng ................... G03B 15/06 396/3 |
| 2012/0163782 | A1 | * | 6/2012 | McColl ................. G03B 15/06 396/3 |
| 2013/0188063 | A1 | * | 7/2013 | Cameron .......... H04N 1/00188 348/207.1 |
| 2019/0101809 | A1 | * | 4/2019 | Wehbe .................. G03B 15/06 |
| 2020/0333688 | A1 | * | 10/2020 | Collier .................. G03B 15/00 |

FOREIGN PATENT DOCUMENTS

DE            0675390 A2 * 10/1995 ............. G03B 15/00

* cited by examiner

*Primary Examiner* — Dung Hong
(74) *Attorney, Agent, or Firm* — DP IP Group; Franco S. De Liguori

(57) ABSTRACT

A frame adapted to mount a fabric for image capturing has a top beam engaged with a pair of side support members and a pair of base support members engaging a base beam. Each of the side support members extends from the top beam downwardly through a curvilinear member to a corresponding base support member. The top beam is connected to the pair of side support members orthogonally. The base support members are connected to the base beam orthogonally.

20 Claims, 14 Drawing Sheets

FRAME ASSEMBLY FOR MOUNTING A FABRIC AND THE FABRIC FOR MOUNTING THEREON

TECHNICAL FIELD

The invention relates to the field of image capturing and in particular to an apparatus for a backdrop for photographs, including still photographs and images for stop-motion video.

BACKGROUND

The background behind a subject for image capturing is an essential factor in the quality of the image. Noisy backgrounds are distracting and draw attention away from the subject. They will diminish the impact of the subject of the image and adversely affect the usefulness of the image.

As such, image capturing professionals typically use different tools to create a suitable background for the subject of image capturing. For example, seamless paper or Chroma keying screen is widely used in photography and video recording.

It is often desirable to be able to photograph with a seamless background so that there is nothing in the shot to detract from the object, or to enable the resulting image of the object to be further processed to include special effects. Typically, a photograph is often taken against a backdrop of plain colour such as green or blue. Sometimes, a really long seamless fabric is used to cover and hide the floor corner or horizon.

U.S. Pat. No. 5,235,368 discloses a photographic studio apparatus for selectively retaining a sheet of material having a given light transmissivity and reflectivity in a selectable curvilinear configuration. The photographic studio apparatus has a support stand having an elevated mount. The mount has a cable for movably securing the upper end of the sheet at selectable heights. The photographic studio apparatus also has articulated mounts for connecting a remote portion of the sheet relative to the support stand at selectable angles and heights for supporting the sheet in a curvilinear configuration. However, this photographic studio apparatus is not suitable for use in relation to a moveable subject and there is no support to the curvilinear region of the sheet of material.

US Patent Published Application No. 20120163782 discloses a backdrop support with a stand and a flexible support sheet. The stand comprises a base end and an opposed support end. The base end supports the stand on a platform. The flexible support sheet is attached at support end of the stand such that the flexible support sheet can extend from the stand and form a curved surface. This backdrop support allows the colour of the backdrop of a photograph to be readily changed by simply replacing a coloured sheet retained by the at least one sheet retaining formation with a different coloured sheet without disassembling the backdrop support of changing the lighting. This backdrop is also not suitable for use in a moveable subject and there is no support to the curvilinear or continuous surface region of the sheet of material.

Published PCT Patent Application No. WO2018188247 discloses a fabric-embedded pop-up display frame that has upright posts and cross beams. The upright posts and cross beams haves corner members. Each corner member has two symmetrical connecting members adapted to be inserted into main cavities of the upright posts and cross beams such that the fabric mounting channels of the upright posts, cross beams, and corner members are communicable for mounting the fabric thereon. This fabric display frame does not have sufficient support to stand alone. It does not have a curvilinear region to guide the fabric to cover a floor corner or horizon.

Any discussion of the prior art throughout the specification should in no way be considered as an admission that such prior art is widely known or forms part of the common general knowledge in the field.

SUMMARY

Problems to be Solved

It may be advantageous to provide a backdrop for photography.

It may be advantageous to provide a frame for mounting a fabric and the fabric for mounting thereon for use in image capturing, and in particular in a photography studio.

It may be advantageous to provide a frame that has a curvilinear member.

It may be advantageous to provide a frame that has a top portion and a bottom portion with a smooth transition between the top portion and bottom portion.

It may be advantageous to a frame assembly that is simple and easy to use.

It may be advantageous to a fabric for use in a frame that has a curvilinear member.

It may be an object of the present invention to overcome or ameliorate at least one of the disadvantages of the prior art, or to provide a useful alternative.

Means for Solving the Problem

In a first aspect of the present invention, there is provided a frame adapted to mount a fabric for image capturing, comprising a top beam engaged with a pair of side support members, a pair of base support members engages a base beam, each of the side support members extends from the top beam downwardly through a curvilinear member to a base support member, wherein the top beam is connected to a pair of side support members orthogonally, and the base support members are connected to the base beam orthogonally.

Preferably, each of the side support members is arranged to be parallel with another respective side support member, each of the base support members is arranged to be parallel with another respective base support member, and each of the curvilinear members is arranged to be parallel with another respective curvilinear member.

Preferably, the top beam and the side support members are connected on a first plane and the base support member and a base beam are connected on a second plane, the curvilinear members are adapted to connect the side support members and the base support member in a smooth transition.

Preferably, the first plane and the second plane form an angle between 60° to 120°.

Preferably, the first plane and the second plane form an angle of 90°.

Preferably, the curvilinear members are made of aluminium.

Preferably, the curvilinear members are made of a resilient material.

Preferably, the frame further comprises one or more reinforcing bars connecting the opposite side of the side support members and/or base support members.

Preferably, each of the top beam, side support members, curvilinear support members, base supports members, and the base beam may comprise one or more member pieces.

Preferably, each of the top beam, side support members, curvilinear support members, base supports members, and the base beam may comprise one or multiple member pieces with the same cross-section profile.

Preferably, the cross-section profile comprises a serrated groove for receiving the fabric.

Preferably, the cross-section profile is a channel for receiving connection brackets and other accessories.

Preferably, each of the member pieces comprises a length of 300 mm to 1000 mm.

Preferably, one or more member pieces have a length of 500 mm, each side support members comprises at least two member pieces to form a length of 1000 mm, each of the base support member comprises at least three member pieces 50 to form a length of 1500 mm, and each of the top beam and the bottom beam comprises at least four member pieces to form a length of 2000 mm.

Preferably, one or more member pieces comprise mitred joints at the extremities of the member pieces.

Preferably, the mitred joints are cut at a 45° angle to form a 90° angle corner.

Preferably, the connecting bracket is adapted to fit into channel of the member pieces and secure thereto with one or more hexagon screws.

In a second aspect of the present invention, there is provided a fabric of mounting on a frame, wherein the frame comprises a top beam engages a pair of side support members, a pair of base support members engages a base beam, each of the side support members extends from the top beam downwardly through a curvilinear member to a base support member, wherein the top beam is connected to a pair of side support members orthogonally, and the base support members are connected to the base beam orthogonally.

Preferably, the fabric comprises a polyester body with silicone edges.

Preferably, the silicone edges are adapted to fit into a groove disposed on each of the top beam, side support members, base support members, base beam, and curvilinear members.

DESCRIPTION OF THE INVENTION

Figure 1:
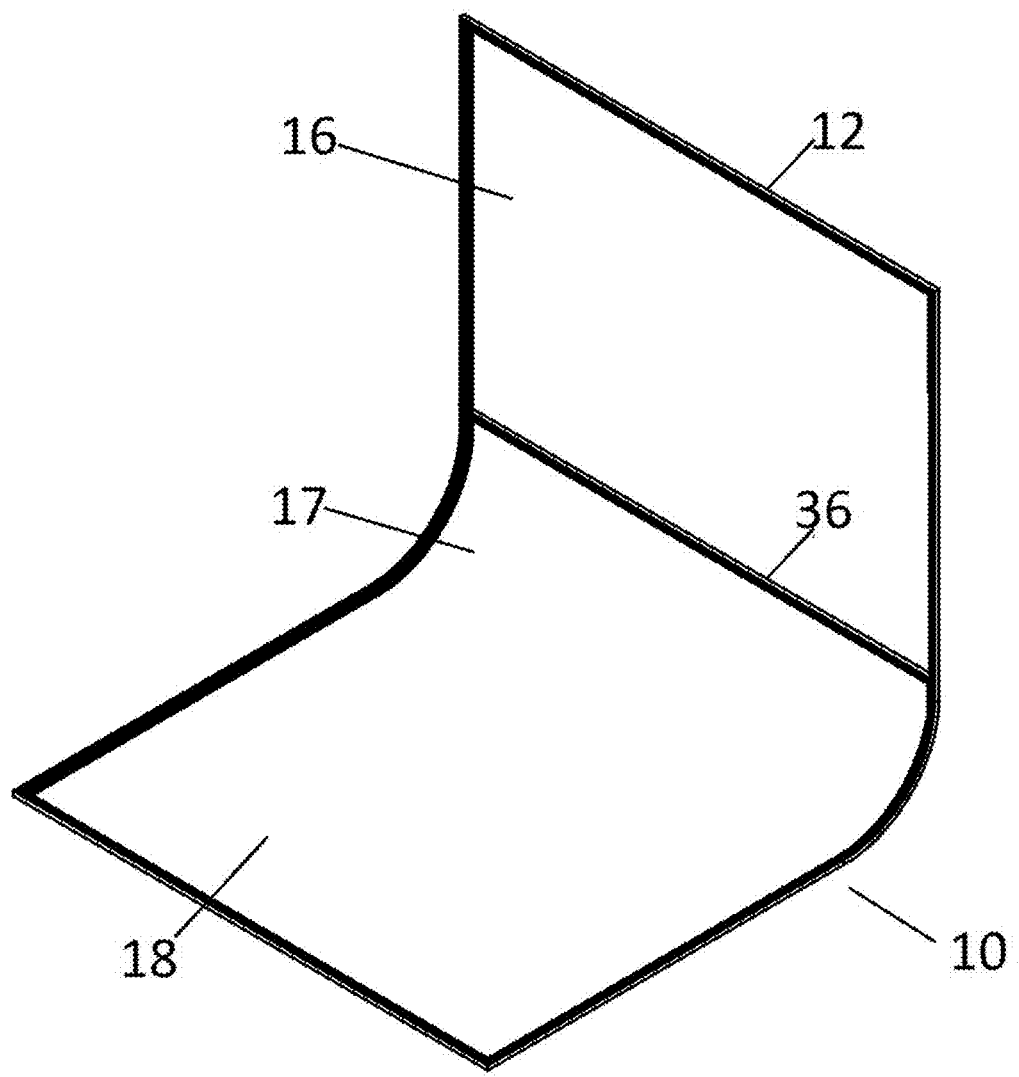
FIG. 1 is an isometric view showing a frame assembly of an embodiment of the present invention.
Figure 2:
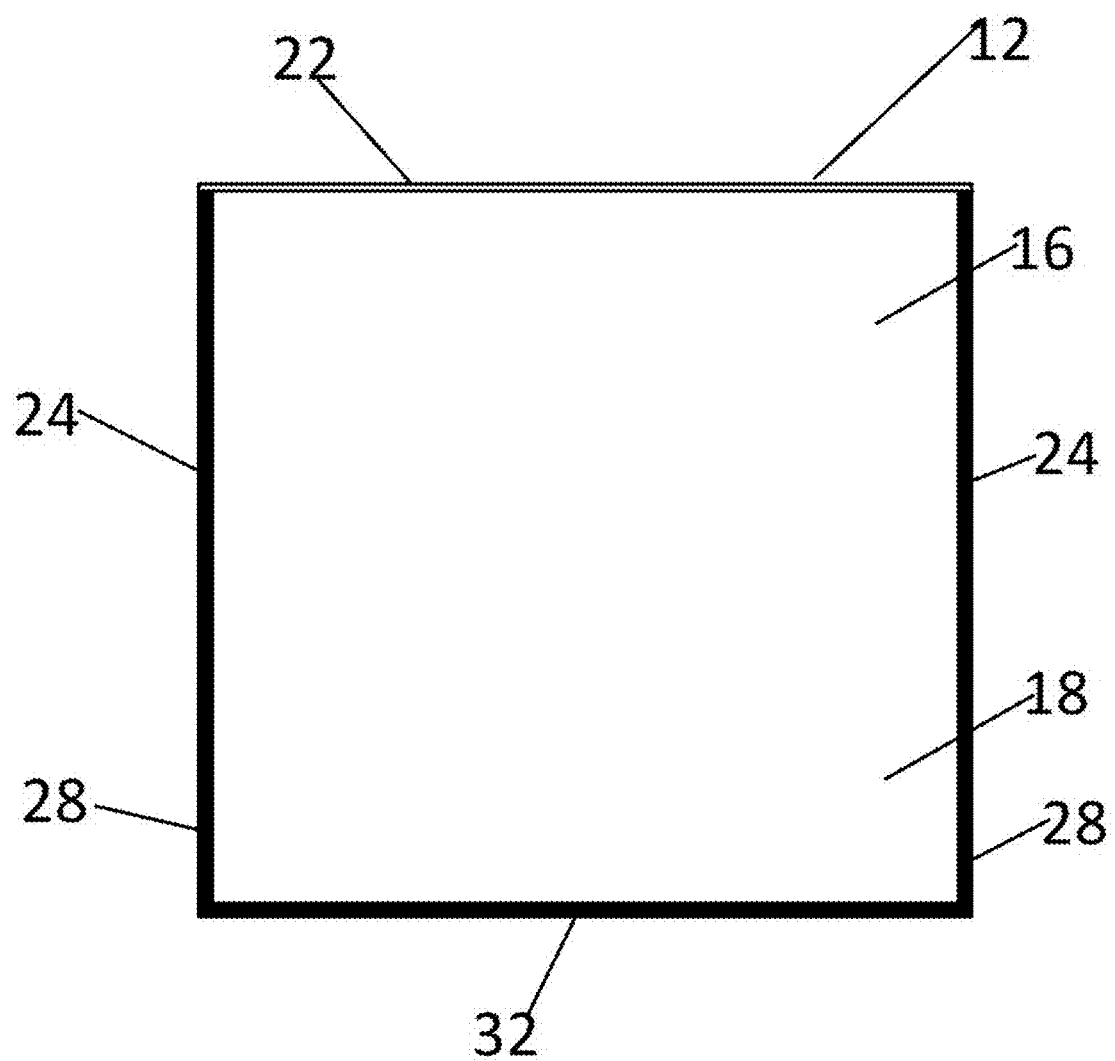
FIG. 2 is a front view of the frame assembly of FIG. 1.
Figure 3:
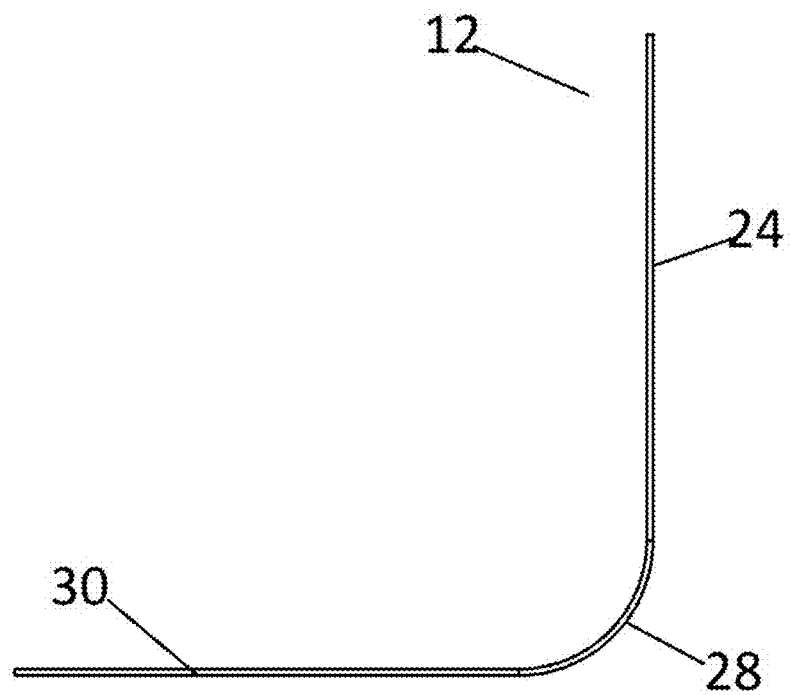
FIG. 3 is a side view of the frame assembly of FIG. 1.
Figure 4:
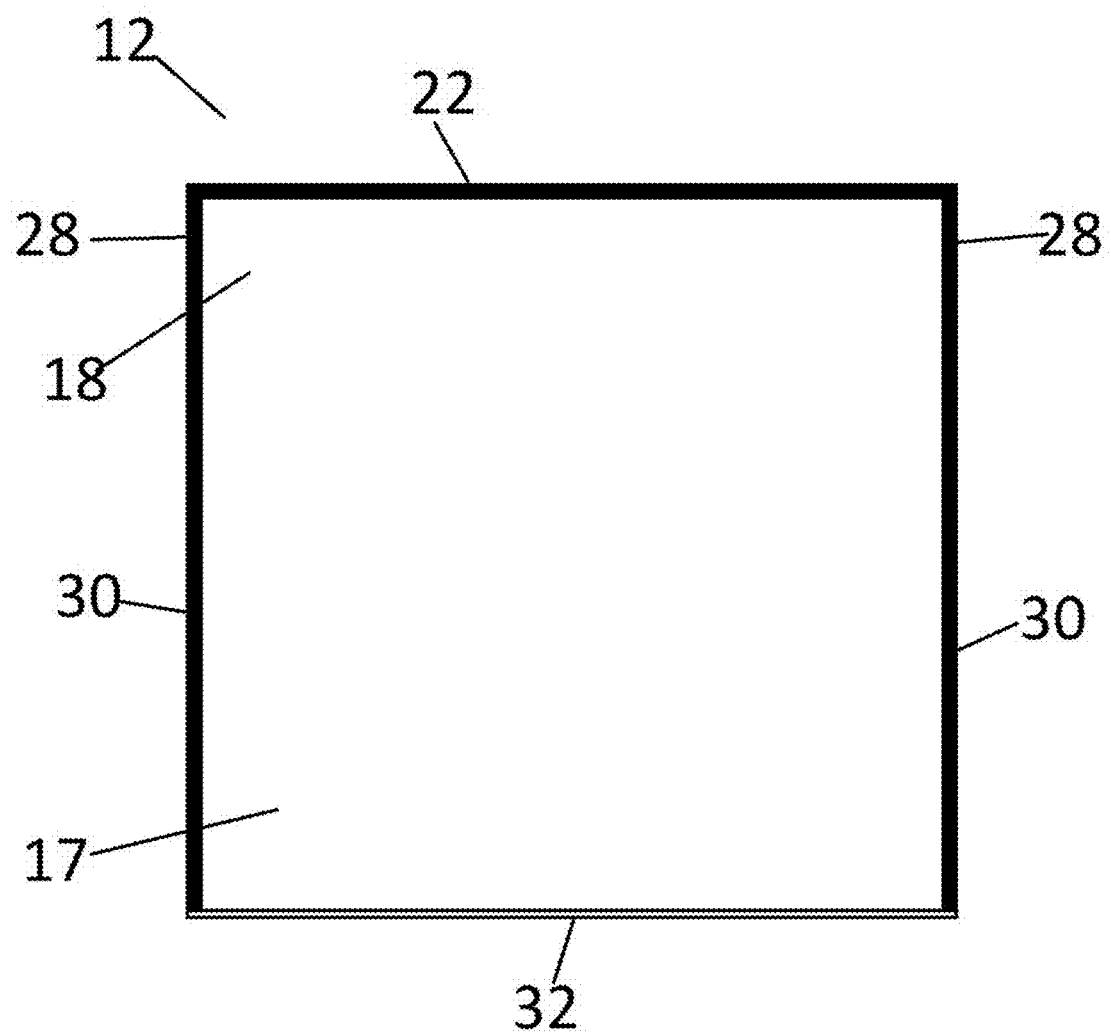
FIG. 4 is a top view of the frame assembly of FIG. 1.
Figure 5:
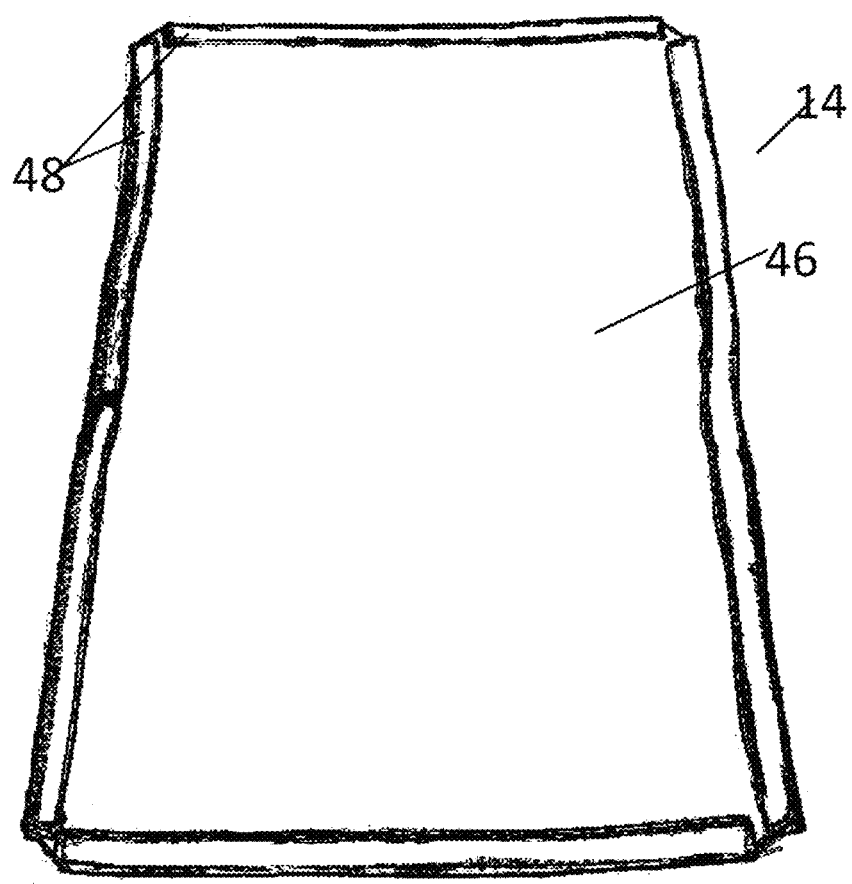
FIG. 5 is a schematic diagram of a fabric for use in the frame assembly of FIG. 1.
Figure 6:
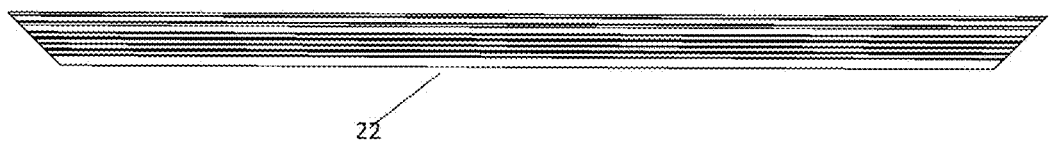
FIG. 6 is a schematic diagram showing a top beam of the frame assembly of FIG. 1.
Figure 7:
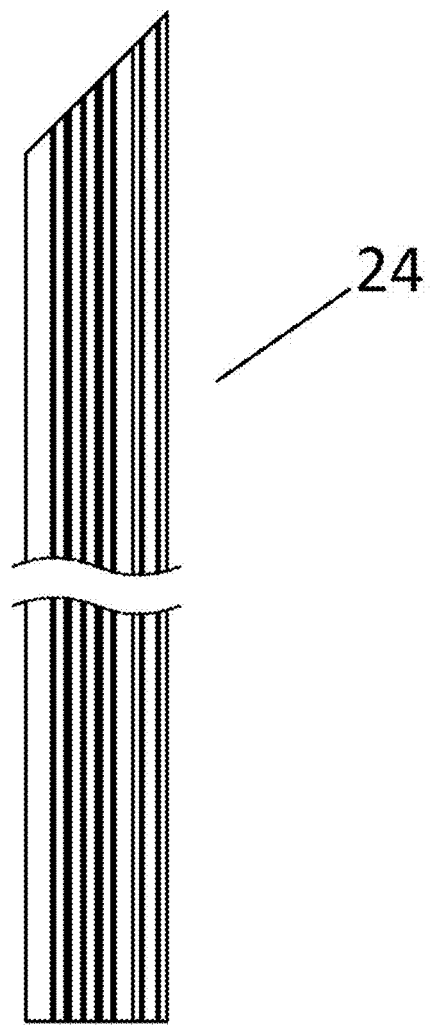
FIG. 7 is a schematic diagram showing a side support member of the frame assembly of FIG. 1.
Figure 8:
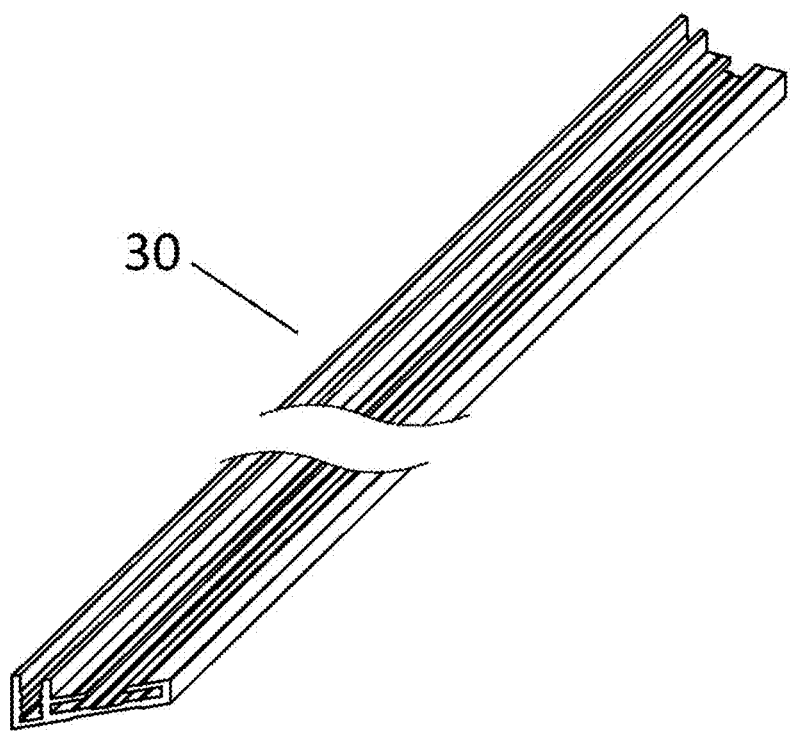
FIG. 8 is a schematic diagram showing a base support member of the frame assembly of FIG. 1.
Figure 9:
FIG. 9 is a schematic diagram showing a base beam of the frame assembly of FIG. 1.
Figure 10:
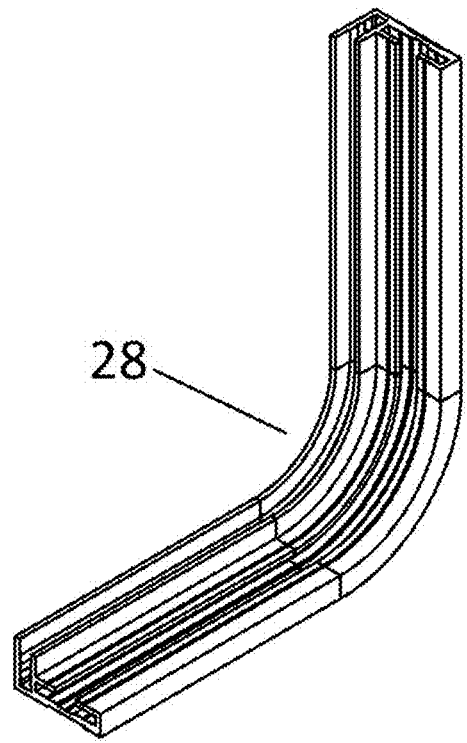
FIG. 10 is a schematic diagram showing a curvilinear member of the frame assembly of FIG. 1.
Figure 11:
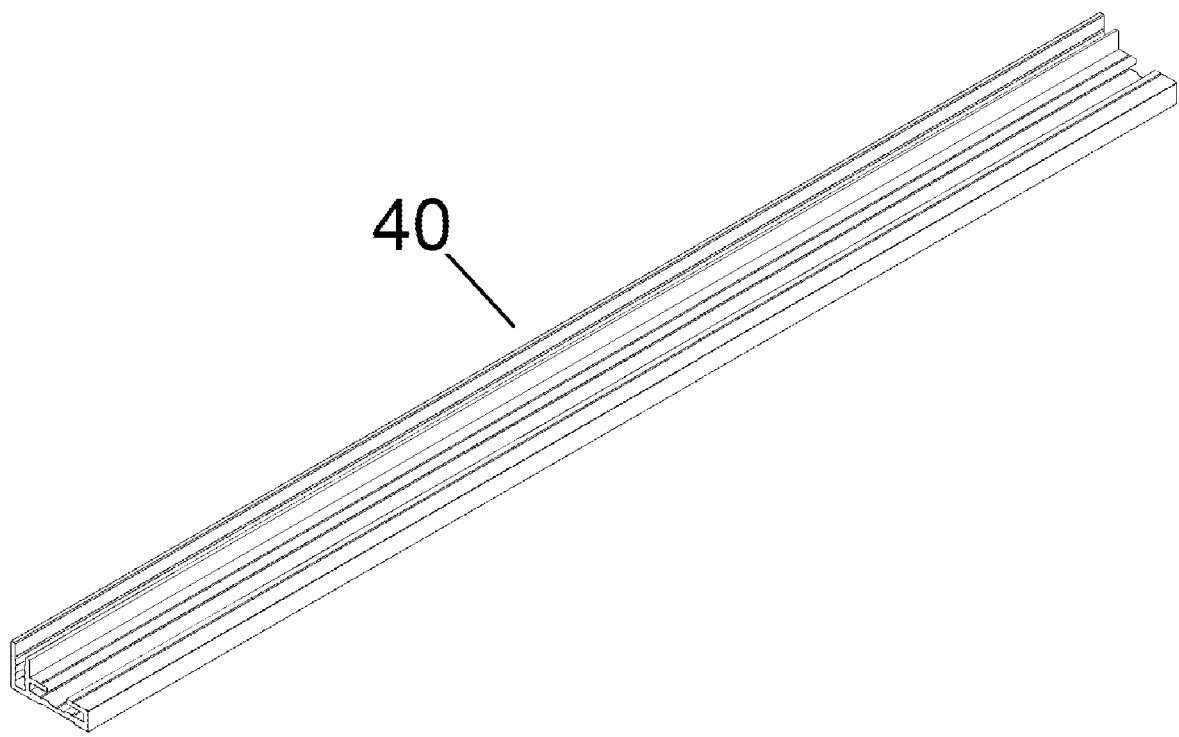
FIG. 11 is a schematic diagram showing a member piece of the frame assembly of FIG. 1.

Referring to FIGS. 1 to 14, there is provided a frame assembly 10 comprising a frame 12 and a fabric 14 attached thereon, wherein the frame 12 has a top portion 16 and a bottom portion 17 joined together by a curvilinear portion 18. The top portion 16 comprises a top beam 22 engages a pair of side support members 24. The bottom portion 17 comprises a pair of base support members 30 engages a base beam 32. The top portion 16 and the bottom portion 17 are held together by the curvilinear members 28.

At the top portion 16, the top beam 22 is connected to a pair of side support members 24 orthogonally. Each of the side support members 24 extends from the top beam downwardly through a curvilinear member 28 to a base support member 30. The base support members 34 are connected to the base beam 32 orthogonally.

Preferably, each of the side support members 24 is arranged to be parallel with one another. Similarly, each of the base support members 30 is arranged to be parallel with one another. Each of the curvilinear members 28 is arranged to be parallel with one another.

In a preferred embodiment, the top beam 22 and the side support members 24 are connected on a first plane and the base support member 30 and a base beam 32 are connected on a second plane. The curvilinear members 28 are adapted to connect the side support members 24 and the base support member 30 such that the first plane and the second plane are orthogonal. In one embodiment, top beam 22 and the base beam 32 are preferably organised in a parallel arrangement on different planes.

However, in another embodiment, the first plane and the second plane may be connected by the curvilinear members 28 at an angle between 60° to 120°. Preferably, the curvilinear members 28 are adapted to provide a smooth transition from the first plane to the second plane.

The fabric 14 is specifically shaped to correspond with the shape of the frame 12 that has curvilinear members 28 such that the fabric can be disposed on the frame 12 with a seamless surface. In one embodiment, the fabric 14 can be slightly stretched when mounting on the frame 12 such that the fabric is tightly fit to the frame in order to prevent creasing.

In one embodiment of the present invention, the fabric 14 is removably mounted on the frame 10 which allows the user to change the fabric within three to four minutes.

The top portion 16 and bottom portion 17 are held together by the curvilinear members 28 which creates a gentle radius typically used in photography backdrops, such as 60 mm to 800 mm with a 60° to 120° angle. In one embodiment, the radius is 400 mm forming a 90° angle.

In a preferred embodiment, the frame 10 has curvilinear members 28 made of aluminium to create a seamless transition from a vertical to a horizontal position. However, the curvilinear members 28 can also be made of other materials such as steel, acrylonitrile butadiene styrene, polycarbonate, polyphenylsulfone, carbon fibre, titanium, three-dimensional graphene, carbine, aero-graphite, metallic microlattice, etc. In another embodiment, the curvilinear members 28 can be made of one or more resilient material or memory material.

In one embodiment of the present invention, the frame 10 further comprises one or more reinforcing bars 36 connecting the opposite side of the side support members 24 and/or base support members 30.

Figure 12:
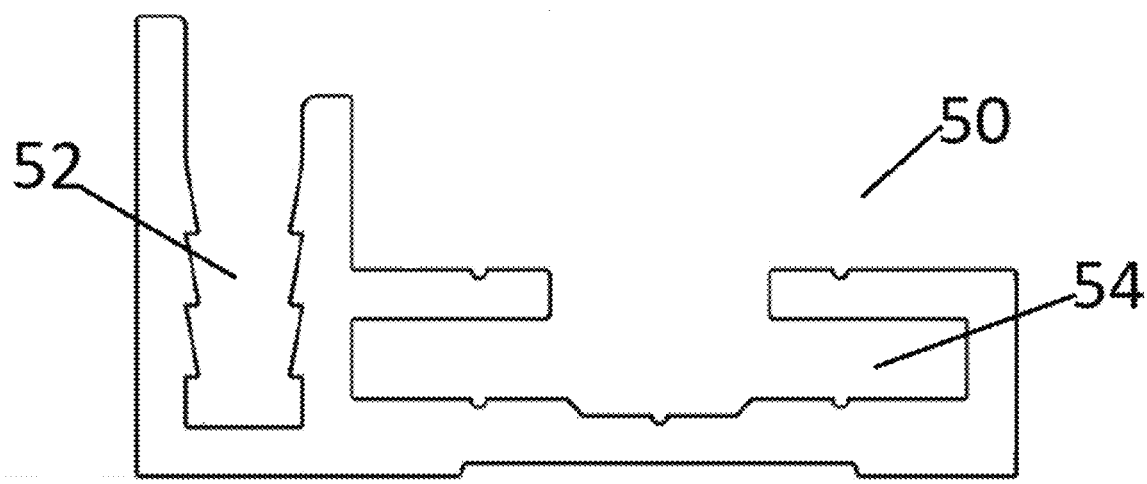
FIG. 12 is a cross-section view of a member piece of the frame assembly of FIG. 1.

Each of the top beam 22, side support members 24, curvilinear support members 28, base supports members 30, and the base beam 32 may comprise multiple member pieces 40 with the same cross-section profile 50 as shown in FIG. 12. Each of the member pieces 40 may have different kinds of mitred joints 42 at the extremities of the member pieces. Each of the member pieces may have a length of 300 mm to 1000 mm. Some mitred joints 42 are cut at a 45° angle, to form a corner, usually a 90° angle.

In a preferred embodiment, a member piece 40 has a length of 500 mm. Each side support member 24 consists of two member pieces to form a length of 1000 mm. Each of the base support member 30 consists of three member pieces 50 to form a length of 1500 mm. Each of the top beam 22 and the bottom beam 24 consists of four member pieces 40 to form a length of 2000 mm.

In one embodiment, the member pieces 40 are made of aluminium extrusion designed to fit a fabric 14 with a polyester body with silicone edges. Preferably the silicone edge can be serrated.

In one preferred embodiment, the member piece 40 has an extrusion designed with a groove 52 adapted to receive silicone edge (that is sewed onto the fabric) to be inserted in the frame 10. Referring to FIG. 12, there is provide a cross-section profile 50 of a preferred embodiment of the present invention. The cross-section profile 50 has a groove 52 for receiving the fabric 14 and a channel 54 for receiving connection brackets 56.

Figure 13:
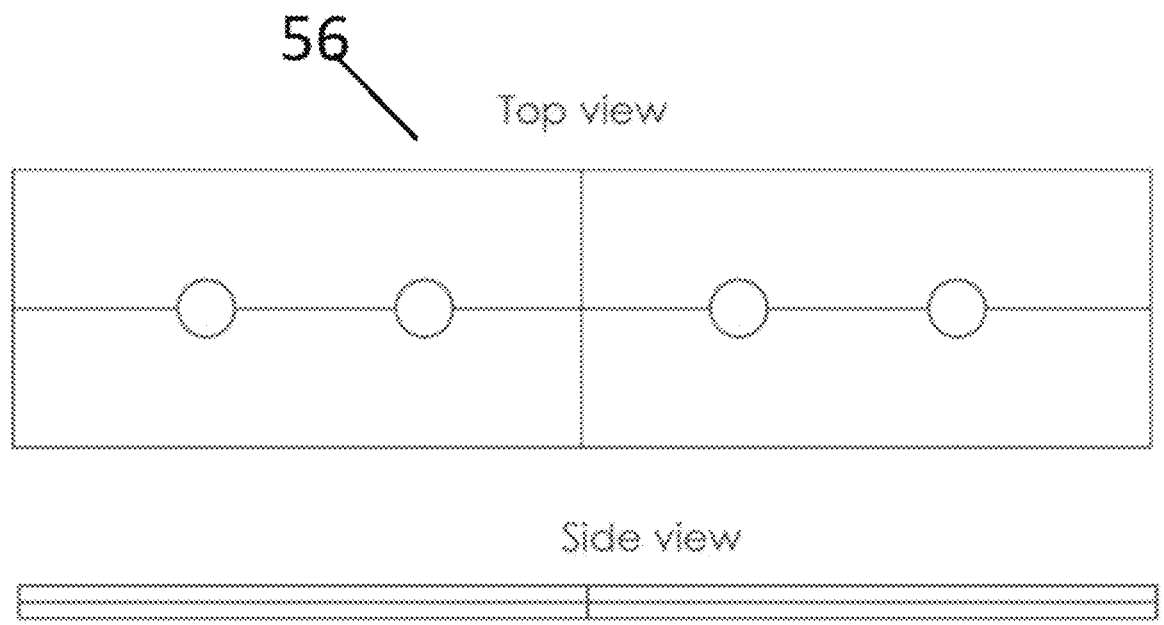
FIG. 13 is a schematic diagram showing a connecting bracket of the frame assembly of FIG. 1.
Figure 14:
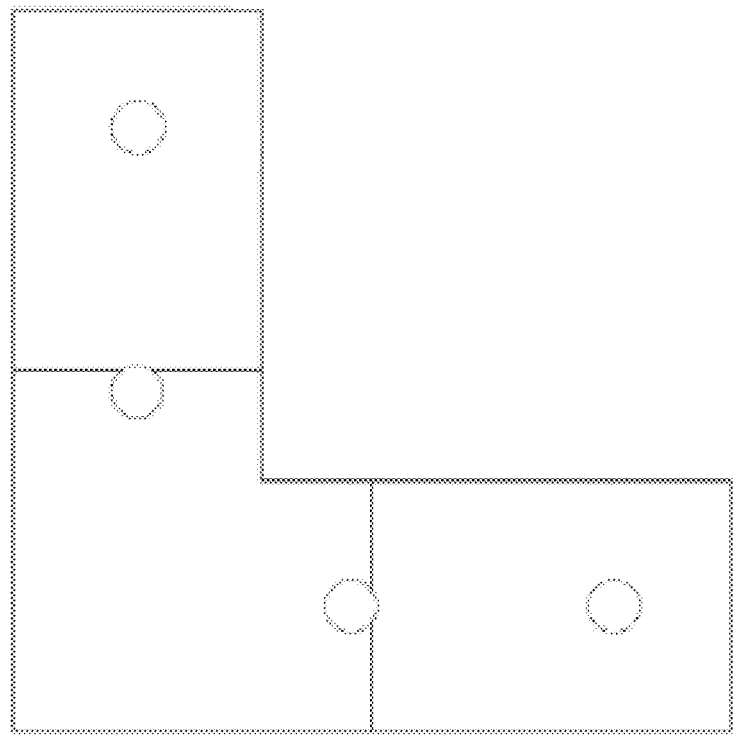
FIG. 14 is a schematic diagram showing another connecting bracket of the frame assembly of FIG. 1.
Figure 14:

In a preferred embodiment, the frame 12 is connected by metal joins such as the connecting bracket 56 adapted to fit into channel 52 of the member pieces. The connecting bracket 56 may have a different shape in order to form a different angle of connection. FIG. 13 shows a rectangular bracket 56a having threaded apertures along the longitudinal axis. The thread apertures are adapted to receive a secure screw such as a hexagon screw to secure the connecting bracket 56 in the channel 54. FIG. 14 shows a L-shaped bracket 56b having threaded apertures along the longitudinal axis. The thread apertures are adapted to receive a securing member such as a hexagon screw to secure the connecting bracket 56 in the channel 54.

In one embodiment, the extrusion cross-section size of a member piece 40 is 35 mm×19 mm. It includes a groove 52 to receive a 15 mm silicone edge of a portion of the fabric 14. Other channels may be provided for the connecting joints or accessories to be inserted. These connecting bracket 56 or accessories can be secured inside the channel 54 with one or more hexagon screws. A cross-section piece or a reinforcing bar 36 can be provided in the middle of the frame 12 for extra support and allows the frame to be free-standing if not placed against the wall. One of the accessories is a wall mount 58 to be inserted inside the channel of the member piece. The wall mount 58 can be mount on the wall to fix the position of the frame 12.

Preferably, the groove 52 has serrated walls deep enough to accommodate and secure the fabric 14 thereon. The channel 54 has an opening 60 with a width smaller than the width of the channel. The channel 54 also has a recess 62 for receiving securing members such as hexagon screw or knurled screw for fixing a bracket 56 inside the channel. The opening 60 thereby provides an access to service the bracket 56 and the securing members.

In one preferred embodiment, the top beam 22, the pair of side support members 24, the curvilinear member 28, the base support member 30, the base beam 32 are made of aluminium extrusion designed to fit the fabric 14 made of polyester with silicon edge. However, the member pieces can also be made of other materials such as steel, acrylonitrile butadiene styrene, polycarbonate, polyphenylsulfone, carbon fibre, titanium, three-dimensional graphene, carbine, aerographite, metallic microlattice, etc.

When each of the top beam 22, the pair of side support members 24, the curvilinear member 28, the base support member 30, a base beam 32 are connected together, the grooves 52 of these frame members are aligned and in communication with the adjacent frame member such that all the grooves form a closed loop.

One of the industrial applications of the present invention is to use the frame assembly as a photography backdrop.

The fabric 14 or skin is a printed polyester fabric with silicon edge sewn all around the fabric. Silicone edge is inserted all around the closed-looped grooves 52. In one preferred embodiment, the silicon edge is serrated in complementary to the serrate grooves 52.

In another embodiment, the fabric 14 may have one or more indicia such as one or more colours imprinted thereon. The fabric 14 may be printed using sublimation printing to print the indicia onto the surface. In a preferred embodiment, the fabric 14 is made of polyester and it has a dye sub print which is colourfast and stainproof. The fabric 14 can be washed after each use and re-used.

In one embodiment, the fabric 14 is at least partially transparent to the non-visible portion of the electromagnetic spectrum but visually opaque. Preferably, the fabric is flame retardant. The fabric is also preferably at least partially stretchable.

Preferably, the fabric is a digital display fabric that allows its pattern or colour change electronically or is programmable. In one embodiment, the fabric comprises a flexible electrophoretic display of organic thin-film transistor backplanes on a flexible substrate such as polymer film. The polymer substrate may be a polyethylene terephthalate substrate or polydimethylsiloxane substrate for flexibility and stretchability. The electrophoretic display may have transparent composites synthesized with a silver nanowire network and crosslinked polyacrylate matrix. Other composites with conductive filler materials such as carbon nanotubes, elastic conductors and metal nanoparticles can be used. This type of fabric provides a flexible and stretchable digital display for changing the backdrop on electronically. Furthermore, the fabric substrate may also include haptic sensors for receiving touch or contact input.

In another embodiment, encapsulation barrier such as SiO2-polymer barrier is introduced to a composite capping layer. The encapsulation barrier allows the digital display fabric subject to washing. Preferably, the digital display fabric is installed with real textile-based polymer cells or polymer solar cells.

In a preferred embodiment, the frame 10 can be powder coated in colours as required by customers.

A person skilled in the art will appreciate that the overall dimensions are subject to change due to customer demands.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrial applicable.

The invention claimed is:

1. A frame adapted to mount a fabric for image capturing, comprising: a top beam engaged with a pair of side support members; and a pair of base support members engaging a base beam, each of the side support members extending from the top beam downwardly through a curvilinear member to a respective one of the base support members,
   wherein the top beam is connected to the pair of side support members orthogonally, and the base support members are connected to the base beam orthogonally; and
   wherein each of the top beam, side support members, curvilinear members, base supports members, and base beam comprises one or more member pieces with the same cross-section profile.

2. The frame of claim 1, wherein each of the side support members is arranged to be parallel with another respective side support member, each of the base support members is arranged to be parallel with another respective base support member, and each of the curvilinear members is arranged to be parallel with another respective curvilinear member.

3. The frame of claim 2, wherein the top beam and the side support members are connected on a first plane and the base support member and a base beam are connected on a second plane, the curvilinear members are adapted to connect the side support members and the base support member in a smooth transition.

4. The frame of claim 3, wherein the first plane and the second plane form an angle between 60° to 120°.

5. The frame of claim 3, wherein the first plane and the second plane form an angle of 90°.

6. The frame of claim 1, wherein the curvilinear members are made of aluminum.

7. The frame of claim 1, wherein the curvilinear members are made of a resilient material.

8. The frame of claim 1, further comprising one or more reinforcing bars connecting the opposite side of the side support members and/or base support members.

9. The frame of claim 1, wherein the one or more member pieces have the same cross-section profile.

10. The frame of claim 9, wherein the cross-section profile comprises a serrated groove for receiving the fabric.

11. The frame of claim 9, wherein the cross-section profile is a channel for receiving connection brackets and other accessories.

12. The frame of claim 11, wherein one of the connection brackets is adapted to fit into the channel and secure thereto with one or more hexagon screws.

13. The frame of claim 9, wherein each of the member pieces comprises a length of 300 mm to 1000 mm.

14. The frame of claim 13 wherein the one or more member pieces have a length of 500 mm, each of the side support members comprises at least two member pieces to form a length of 1000 mm, each of the base support member comprises at least three member pieces 50 to form a length of 1500 mm, and each of the top beam and the bottom beam comprises at least four member pieces to form a length of 2000 mm.

15. The frame of claim 1, wherein the one or more member pieces comprise mitred joints at the extremities of the member pieces.

16. The frame of claim 15, wherein the mitred joints are cut at a 45° angle to form a 90° angle corner.

17. A fabric for mounting on a frame, wherein the frame comprises a top beam engaging a pair of side support members, and a pair of base support members engaging a base beam, each of the side support members extending from the top beam downwardly through a curvilinear member to a base support member, the top beam being connected to the pair of side support members orthogonally, and the base support members being connected to the base beam orthogonally; and wherein the fabric comprises a polyester body with silicone edges mounted to the body, the silicone edges being adapted to fit into a serrated groove disposed on each of the top beam, side support members, base support members, base beam, and curvilinear members of the frame.

18. A frame adapted to mount a fabric for image capturing, the frame comprising:
   a pair of side support members;
   a top beam connected to the pair of side support members orthogonally;
   a base beam;
   a pair of base support members connected to the base beam orthogonally, each of the side support members extending from the top beam downwardly through a curvilinear member to a respective one of the base support members; and
   one or more reinforcing bars connecting opposite sides of the side support members and/or base support members.

19. The frame of claim 18, wherein each of the top beam, side support members, curvilinear members, base supports members, and base beam comprises one or more pieces having the same cross-section profile.

20. The frame of claim 19, wherein the cross-section profile comprises a serrated groove for receiving the fabric.

* * * * *